United States Patent

Nagano et al.

[11] Patent Number: 5,401,443
[45] Date of Patent: Mar. 28, 1995

[54] METHOD OF CONTINUOUS PRODUCTION OF MICROCAPSULES

[75] Inventors: Hideo Nagano; Yoshihito Hodosawa; Hirokazu Saitoh, all of Shizuoka, Japan

[73] Assignee: Fuji Photo Film Co., Ltd., Kanagawa, Japan

[21] Appl. No.: 937,688

[22] Filed: Sep. 1, 1992

[30] Foreign Application Priority Data

Sep. 2, 1991 [JP] Japan ................. 3-246475

[51] Int. Cl.⁶ .................................. B01J 13/16
[52] U.S. Cl. ................... 264/4.7; 264/4.32; 264/4.33; 428/402.21; 503/215
[58] Field of Search ........... 264/4.32, 4.33, 4.7; 428/402.21; 503/215

[56] References Cited

U.S. PATENT DOCUMENTS

| | | | |
|---|---|---|---|
| 3,464,926 | 9/1969 | Vandegaer et al. | 264/4.7 |
| 3,577,515 | 5/1971 | Vandegaer | 264/4.7 X |
| 4,081,384 | 3/1978 | Pracht | 264/4.7 X |
| 4,379,071 | 4/1983 | Schnöring et al. | 264/4.7 |
| 4,409,201 | 10/1983 | Heinrich et al. | 264/4.1 X |
| 4,417,916 | 11/1983 | Beestman et al. | 264/4.7 X |
| 4,668,580 | 5/1987 | Dahm et al. | 428/402.21 |
| 4,761,255 | 8/1988 | Dahm et al. | 264/4.7 |
| 4,889,877 | 12/1989 | Seitz | 503/215 X |
| 5,075,279 | 12/1991 | Sano | 264/4.7 X |

FOREIGN PATENT DOCUMENTS

| | | | |
|---|---|---|---|
| 0017409 | 10/1980 | European Pat. Off. | B01J 13/02 |
| 2305229 | 10/1976 | France | B01J 13/02 |

Primary Examiner—Richard D. Lovering
Attorney, Agent, or Firm—Sughrue, Mion, Zinn, Macpeak & Seas

[57] ABSTRACT

An oily liquid and an aqueous liquid as prepared at a temperature of 80° C. are continuously emulsified at a temperature of 50° C. or higher to give an emulsion, then a liquid comprising a polyamine and a concentration adjusting water of 50° C. or higher is added to the emulsion and mixed in a static mixer, the emulsion mix is continuously flown into an encapsulation device from the bottom to the top thereof, and microcapsules are obtained by overflowing after a retention time of 60 minutes on average.

1 Claim, 2 Drawing Sheets

METHOD OF CONTINUOUS PRODUCTION OF MICROCAPSULES

BACKGROUND OF THE INVENTION

The present invention relates to a method of producing microcapsules each having a wall of a polyurethane-urea resin film.

For producing microcapsules by adding a polyisocyanate to an oily liquid containing a capsule core substance, emulsifying and dispersing the oily liquid and an aqueous liquid containing an emulsifier to form an emulsion, and reacting a polyamine with the emulsion to form a synthetic polymer wall film at the liquid-drop interface to encapsulate the hydrophobic liquid surface; the following methods are known.

(1) A method in which the reaction is initiated in a high stirring mixing zone to form an emulsion, then the reaction product is transferred to a multi-stage cascade of a container, and the temperature is stepwise elevated and the temperature in each step is kept constant [JP-A-SHO.55-124534 (the term "JP-A" as used herein means an "unexamined published Japanese patent application")].

(2) A method in which a polyisocyanate solution is mixed and dissolved in an oily liquid containing a capsule core substance and thereafter the solution is mixed with an aqueous liquid containing an emulsifier to be fed to an emulsifying device for continuous emulsification (JP-A-SHO.56-108529).

(3) A method in which the emulsified dispersion is continuously passed through a tubular reactor and is reacted therein at a temperature of from 40° to 95° C. (JP-A-SHO.58-112042).

(4) A method in which a polyisocyanate insoluble in the oily liquid is mixed in an inert organic phase, the mixture is continuously emulsified in an aqueous phase, and a diamine or polyamine is added to the resulting emulsion for poly-addition to the interface with the polyisocyanate (JP-A-SHO.61-21728).

(5) A method in which the dispersion is heated by direct introduction of steam thereinto for encapsulating the hydrophobic oily liquid film with the synthetic polymer wall (JP-A-HEI.2-139030).

One example of a typical conventional production method is explained with reference to the flow-sheet of a production apparatus of FIG. 2, in which an oily liquid containing a capsule core substance is prepared at a temperature of 80° C. or higher, the oily liquid is cooled to room temperature in the tank 1, an aqueous liquid formed by dissolving polyvinyl alcohol in water at 80° C. or higher is cooled to room temperature in the aqueous liquid tank 6, a polyisocyanate is prepared in the tanks 2 and 3, a polyol is prepared in the tank 4, a polyisocyanate and a polyol each of a determined amount are continuously added via the respective pumps 1a, 2a, 3a and 4a, the mixture liquid is continuously added to the aqueous liquid as fed via the metering pump 6a with mixing it in the in-line mixer 5, to conduct emulsification and dispersion of the mixture liquid through the preemulsifier 7 and the emulsifier 8, the resulting emulsion is transferred to the encapsulating tank 9, a polyamine and a concentration adjusting water are added to the encapsulating tank 9 from the polyamine tank 10 and the concentration adjusting water tank 11, respectively, via the respective pumps 10a and 11a, when a suitable amount of the emulsion has gathered in the tank 9, and the content in the tank 9 is heated up to 80° C. with a tank jacket with stirring and is kept at the temperature for 60 minutes to obtain a capsule liquid.

However, in all the conventional methods (1) to (5), emulsification is effected at room temperature so as to prevent encapsulation reaction during emulsification and thereafter the reaction system is heated for effecting wall filming treatment of the system. Therefore, these involve the following problems.

Since the polyisocyanate to be used for formation of the polyurethane wall is highly reactive, microcapsules having poor heat resistance and solvent resistance are formed if the temperature for treatment of the encapsulating system is not elevated immediately after emulsification. For elevation of the temperature, there have been proposed a method of stepwise elevating the temperature of the emulsion of (1) with a jacket or a hose line after the emulsion has been put in a tank (JP-A-SHO.55-124534); and a method of directly introducing steam in the emulsion of (5) (JP-A-HEI.2-139030). However, both of them need much time for elevating the temperature so that a uniform wall film could not be formed and, as a result, the heat-resistance and the solvent resistance of microcapsules formed are not sufficient.

The oily liquid and the aqueous liquid are prepared at a high temperature of 80° C. or higher. However, where emulsification of them is effected at a low temperature, they are once cooled and then emulsified and thereafter are again heated for encapsulation reaction. The operation involves much energy loss. In addition, where the oily liquid contains a colorant or the like as the capsule core substance, the colorant would easily precipitate when it is cooled so that the concentration of the colorant in the liquid could not be made high defectively.

Further, since the encapsulation is effected in the tank to which the liquids are added thereto from the top thereof, capsules formed adhere to the vapor-liquid interface of the inner wall of the tank. The adhered capsules must be removed periodically by cleaning, which needs intermittence of the production process to result in depression of the production yield and elevation of the production cost. As a countermeasure to the problem, a method of continuously introducing the emulsion to the tubular reactor for effecting the encapsulation reaction is proposed in JP-A-SHO.58-112042 of (3). However, the method still involves various problems that aggregated capsules are formed because of the insufficient stirring in the reactor, that a large-sized equipment is necessary for ensuring a determined retention time for encapsulation and that removal of the capsules as adhered to the wall in the reactor is difficult.

SUMMARY OF THE INVENTION

The object of the present invention is to overcome the above-mentioned problems in the conventional methods and to provide a method of efficiently producing microcapsules having excellent characteristics, which method does not need much time for elevating the reaction temperature, which is free from deterioration of the heat resistance and solvent resistance of the microcapsules formed, which may use a colorant having a high concentration, which is free from adhesion of the formed capsules to the wall of a tank during encapsulation reaction, which does not need much time for cleaning the tank and which uses a small-sized equipment.

DETAILED DESCRIPTION OF THE PREFERRED EMBODIMENTS

The above-mentioned object of the present invention is attained by a method of continuous production of microcapsules where a polyisocyanate is mixed with an oily liquid containing a capsule core substance, the mixture liquid is emulsified and dispersed in an aqueous liquid containing an emulsifier to form an emulsion and the emulsion is reacted with a polyamine to form microcapsules each having a polyurethane-urea resin wall at the liquid-drop interface; the method being characterized in that the mixture liquid of the oily liquid and the aqueous liquid are continuously emulsified at a temperature of 50° C. or higher, then a polyamine and a hot water of 50° C. or higher are added to the emulsion and thereafter wall filming treatment is applied to the emulsion. As one embodiment of the method, addition of the polyamine and hot water is effected by continuous addition and mixture of them to a pipe line of the emulsified liquid and thereafter the wall filming treatment is effected. As another embodiment of the method, the emulsion to which the polyamine and water have been continuously added is overflown with continuously feeding it from the bottom of an encapsulating device to the top thereof to continuously effect the wall filming treatment.

In the production method of the present invention, since emulsification is continuously effected in an extremely short period of time, encapsulation during emulsion may be neglected even at a high temperature of 50° C. or higher and it gives no problem to the quality of the microcapsules to be formed by the method.

The method of the present invention will be explained below with reference to FIG. 1.

Figure 1:
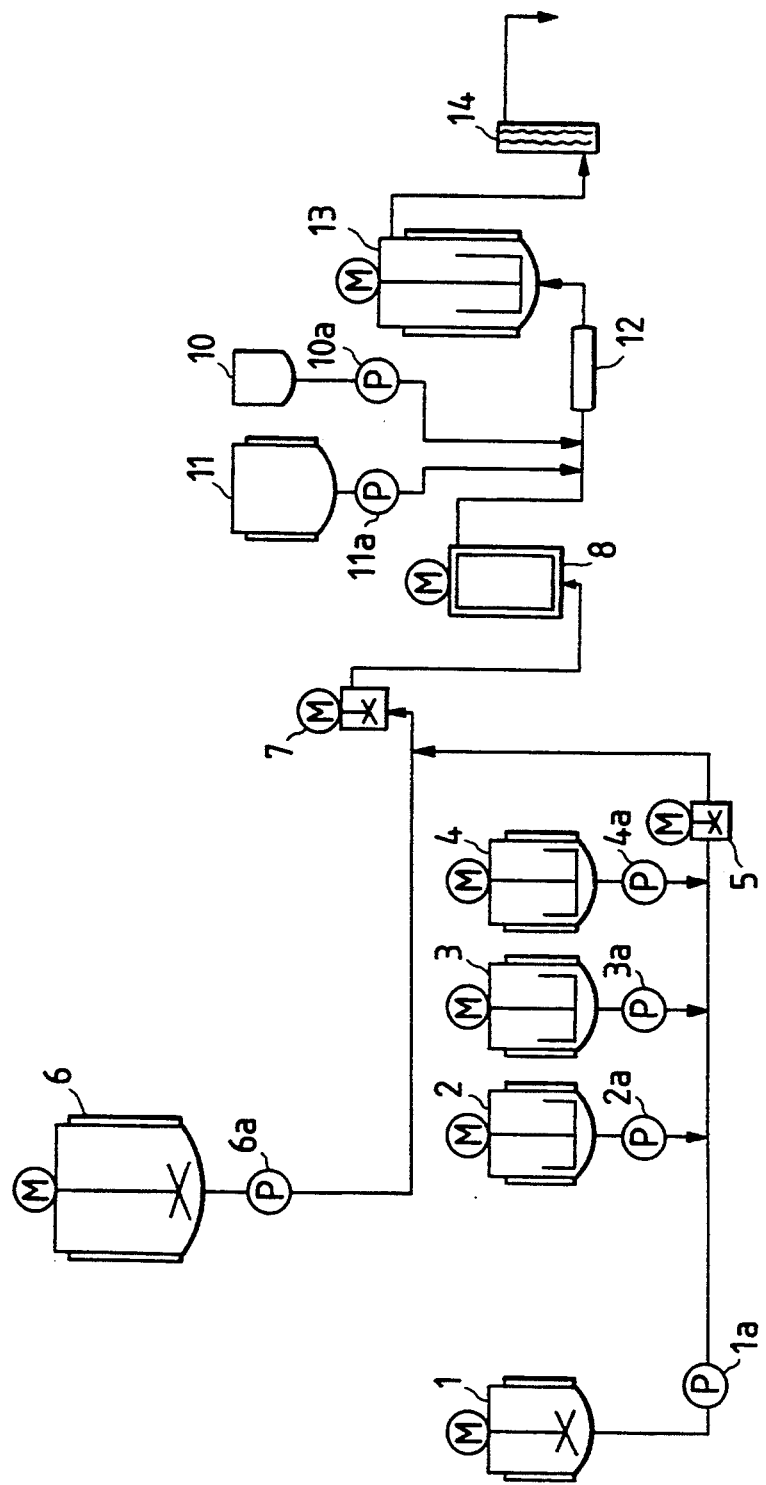
FIG. 1 is a flow-sheet of a method of producing microcapsules of the present invention.

FIG. 1 shows a flow-sheet of the method of producing microcapsules of the present invention.

In FIG. 1, an oily liquid containing a colorant is stored in the container 1 at a temperature of 50° C. or higher; and a polyisocyanate and a polyol to be used as wall forming agents are stored in the containers 2, 3 and 4. The liquids in 1, 2, 3 and 4 are continuously introduced into the in-line mixer at a desired ratio, after having been metered by the metering pumps 1a, 2a, 3a and 4a, respectively.

The metering pump to be used herein may be any one having a metering function, such as a gear pump, a plunger pump, a monopump or a diaphragm pump, which is not specifically defined with respect to the type. As the in-line mixer, usable are a static mixer and a high power shearing mixer. Anyhow, it is not specifically defined with respect to the type, provided that it may uniformly mix the above-mentioned liquids 1, 2, 3 and 4.

An aqueous liquid is stored in the container 6 at a temperature of 50° C. or higher, and it is introduced into the pre-emulsifier 7 at a desired ratio to the oily liquid in the in-line mixer 5, after having been metered by the metering pump 6a. After the oily liquid and the aqueous liquid are pre-emulsified therein at a temperature of 50° C. or higher, the pre-emulsion is then fed to the emulsifier 8. The pre-emulsifier 7 may be a pipe line homomixer or a homomic line flow; and the emulsifier 8 may be any one capable of effecting continuous emulsification, such as a pipe line homomixer, a colloid mill or a double cylindrical emulsifier, and the type thereof is not specifically defined.

To the emulsion as obtained by emulsification of the liquids in the emulsifier at 50° C. or higher, continuously fed are a polyamine and a capsule concentration adjusting water of 50° C. or higher from the containers 10 and 11, via the metering pumps 10a and 11a, respectively, and they are continuously mixed with the static mixer 12. The resulting mixture liquid is then injected into the encapsulation device 13 from the bottom thereof, in which encapsulation of the liquid is effected for a determined period of time. After encapsulation, the liquid is then taken out from the overflow outlet at the top of the device and is cooled in the heat exchanger.

Since the microcapsules to be produced by the method of the present invention are treated at a temperature of 50° C. or higher from the emulsification step, formation of the capsule wall is extremely rapid and, therefore, the microcapsules formed have extremely excellent heat resistance and solvent resistance.

In addition, since the temperature of the oily liquid and the aqueous liquid is high, elevation of the temperature for encapsulation is unnecessary, or if necessary, it may be extremely small. Further, since the temperature of the oily liquid is high, the colorant hardly precipitates out in the oily liquid so that the concentration of the colorant in the oily liquid may be high. The high concentration of the colorant is effective, where the present invention is applied to a pressure-sensitive paper, since the color density to be obtained may be high.

In addition, since the emulsion to which a polyamine and a concentration adjusting water have been added is continuously fed to the tank from the bottom to the top by overflow system, no vapor-liquid interface is formed in the tank so that capsules formed do not adhere to the inner wall of the tank at the vapor-liquid interface. Therefore, cleaning of the tank is unnecessary. As compared with a tubular container, the equipment for the method of the present invention is simple and may have a sufficient retention time.

Next, the present invention will be explained in more detail by way of the following examples.

EXAMPLES

EXAMPLE 1

FIG. 1 is referred to. As colorants, 10 parts by weight of crystal violet lactone, one part by weight of benzoyl leucomethylene blue and 4 parts by weight of 3-[4-(diethylamino)-2-ethoxyphenyl]-3-(2-methyl-1-ethyl-3-indolyl)-4-azaphthalide were dissolved in 200 parts by weight of diisopropylnaphthalene at 95° C. and then cooled to 80° C. to prepare an oily liquid, which was stored in the oily liquid tank 1.

Next, 15 parts by weight of polyvinyl alcohol was dissolved in 135 parts by weight of water and dissolved at 95° C. and then cooled to 80° C. to prepare an aqueous liquid, which was stored in the aqueous liquid tank 6.

Carbodiimide-modified diphenylmethane diisocyanate (Millionate MTL, trade name by Nippon Polyurethane Co.), as a polyisocyanate, was stored in the container 2; biuret hexamethylene diisocyanate (Sumidule N-3200, trade name by Sumitomo Bayer Urethane Co.)

was in the container 3; and ethylenediamine-butylene oxide adduct (mols of butylene oxide added to ethylenediamine: 16.8 mols, molecular weight: 1,267), as an amine-alkylene oxide adduct, was in the container 4.

Diethylenetriamine, as a polyamine, was stored in the container 10; and a capsule concentration adjusting water of 80° C. in the container 11.

The aqueous liquid was fed from the aqueous liquid tank 6 via the gear pump 6a, at a flow rate of 1,000 g/min. Next, the liquids from the oily liquid tank 1, the polyisocyanate tank 2, the isocyanate tank 3 and the polyol tank 4 were fed to the in-line mixer 5 (pipe line homomixer, manufactured by Tokushu Kika Kogyo K.K.) via the respective gear pumps 1a, 2a, 3a and 4a, at a flow rate of 850 g/min, 60 g/min, 60 g/min and 30 g/min, respectively, and mixed therein. Then, the mixture liquid was mixed with the above-mentioned aqueous liquid in the pre-emulsifier 7 (homomic line flow, manufactured by Tokushu Kika Kogyo K.K.) to form a pre-emulsion. The emulsion thus pre-emulsified at a temperature of about 80° C. was then fed into the emulsifier 8 (double cylindrical emulsifier), where the diameter of the oil drops formed was continuously adjusted to be 8 μm. Next, the liquids of the polyamine tank 10 and the concentration adjusting water tank 11 were mixed with the emulsion, via the gear pumps 10a and 11a, respectively, at a flow rate of 8 g/min and 800 g/min, by the aid of the static mixer 12. The resulting mix was then fed into the encapsulation device 13. The mix was continuously flown as a liquid of a temperature of 80° C. in the encapsulation device 13, from the bottom of the device 13 to the top thereof. After it was retained therein for 60 minutes on average, it was overflown to obtain a capsule liquid.

To 100 parts by weight of the capsule liquid thus obtained were added 30 parts by weight of an aqueous 15% solution of polyvinyl alcohol, 10 parts by weight, as a solid content, of carboxy-modified SBR latex and 20 parts by weight of starch grains (mean grain size 15 μm).

Next, water was added to the mix so that the solid content was adjusted to 20%. Thus, a coating liquid was prepared.

The coating liquid was coated on a base paper (40 g/m$^2$) in a dry weight of 4.0 g/m$^2$, with an air knife coater, to obtain a microcapsule sheet.

EXAMPLE 2

The same process as in Example 1 was repeated, except that the temperature of the oily liquid and the aqueous liquid was varied to 60° C., the emulsification temperature was varied to 60° C., and the liquid mix to be encapsulated was treated in the encapsulation device at 70° C. Thus, a microcapsule sheet was obtained.

Comparative Example 1

Figure 2:
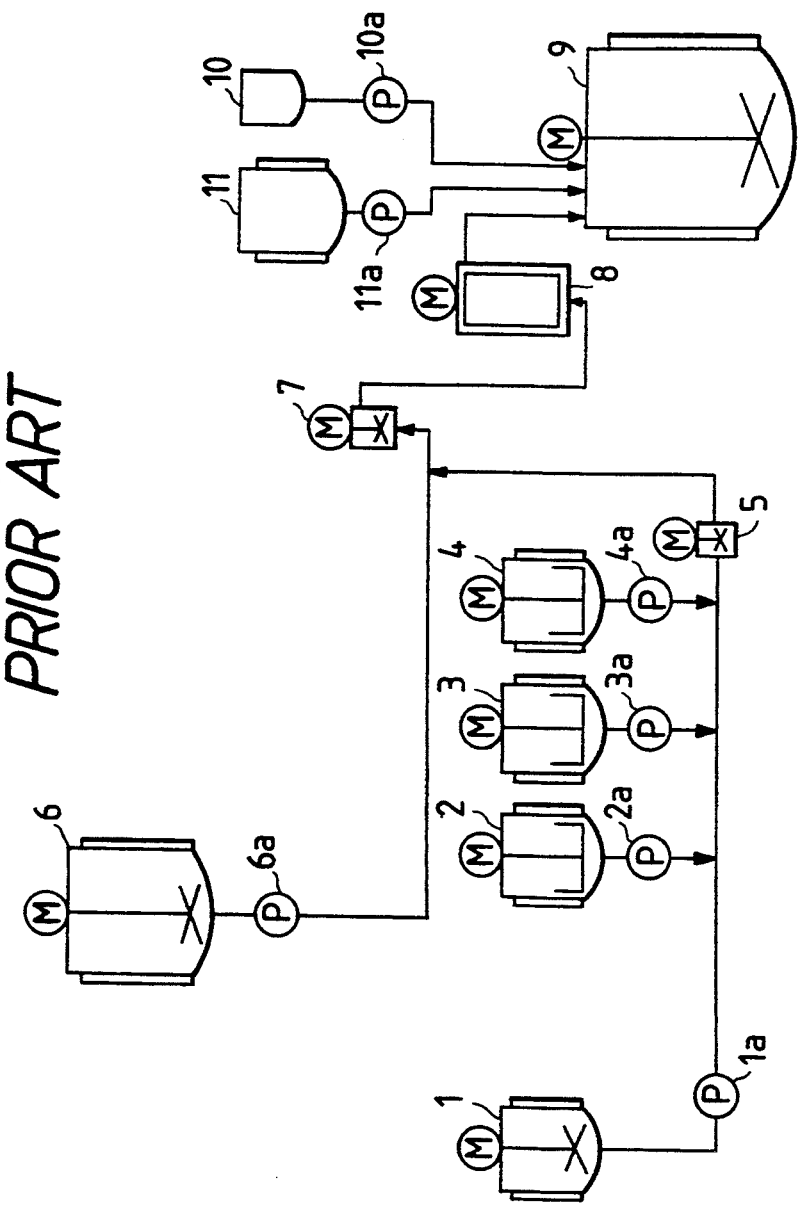
FIG. 2 is a flow-sheet of a conventional method of producing microcapsules.

The apparatus of FIG. 2 was used. The composition of the oily liquid used and that of the aqueous liquid used were same as those in Example 1. The temperature of the two liquids was 40° C. Emulsification in the emulsifier 8 was effected at 40° C. The resulting emulsion was filled in the encapsulating tank 9. When the encapsulating tank was filled with the emulsion, 0.4 part by weight, to 100 parts by weight of the emulsion, of diethylenetriamine, as a polyamine, and 40 parts by weight, to 100 parts by weight of the emulsion, of concentration adjusting water of 20° C. were added to the tank. Then, the content in the tank was heated up to 80° C. with a tank jacket and was kept at the temperature for 60 minutes to obtain a capsule liquid. The capsule liquid thus obtained is formed into a coating composition under the same condition as in Example 1, and the composition was coated and dried on a base paper to obtain a microcapsule sheet.

EXAMPLE 3

FIG. 1 is referred to. As colorants, 6 parts by weight of 2-anilino-3-methyl-6-N-ethyl-N-isopentylaminofluoran and one part by weight of 2-dibenzylamino-6-diethylaminofluoran were dissolved in 100 parts by weight of 1-phenyl-1-xylylethane at 95° C. and then cooled to 80° C. The solution was stored in the oily liquid tank 1.

Next, 15 parts by weight of polyvinyl alcohol was dissolved in 135 parts by weight of water at 95° C. and then cooled to 80° C. The solution was stored in the aqueous liquid tank 6.

As a polyisocyanate, carbodiimide-modified diphenylmethane diisocyanate (Millionate MTL, trade name by Nippon Polyurethane Co.) was stored in the container 2; and biuret hexamethylene diisocyanate (Sumidule N-3200, trade name by Sumitomo Bayer Urethane Co.) was in the container 3. As an amine-alkylene oxide, ethylenediamine-butylene oxide adduct (mols of butylene oxide added to ethylenediamine: 16.8 mols, molecular weight: 1,267) was stored in the container 4.

As a polyamine, tetraethylenepentamine was stored in the tank 10; and capsule concentration adjusting water of 80° C. was stored in the tank 11.

The aqueous liquid was fed from the aqueous liquid tank 6 via the plunger pump 6a at a flow rate of 1,000 g/min. Next, from the oily liquid tank 1, the polyisocyanate tank 2, the isocyanate tank 3 and the polyol tank 4, the respective liquids were fed via the respective plunger pumps 1a, 2a, 3a and 4a, at a flow rate of 850 g/min, 60 g/min, 60 g/min and 30 g/min, respectively, into the in-line mixer 5 (static mixer) and mixed therein. Next, the resulting mixture liquid was mixed with the aqueous liquid in the pre-emulsifier 7 (pipe line homomixer, manufactured by Tokushu Kika Kogyo K.K.) to form a pre-emulsion. The pre-emulsion thus formed at a temperature of about 80° C. was then fed to the emulsifier 8 (colloid mill, manufactured by Nippon Seiki Seisakusho K.K.), where the diameter of oil drops therein was continuously adjusted to be 7 μm. Next, the liquids from the polyamine tank 10 and the concentration adjusting water tank 11 were added to the emulsion via the plunger pumps 10a and 11a, respectively, at a flow rate of 8 g/min and 800 g/min, respectively, and mixed with the static mixer 12. The resulting mixture liquid was then fed to the encapsulation device 13. The liquid was continuously flown into the encapsulating device 13 at a temperature of 80° C., from the bottom to the top thereof. After the liquid was retained for 60 minutes on average, a capsule liquid was thus obtained by overflowing.

To 100 parts by weight of the capsule liquid thus obtained were added 30 parts by weight of an aqueous 15% solution of polyvinyl alcohol, 10 parts by weight, as a solid content, of carboxy-modified SBR latex, and 20 parts by weight of starch grains (mean grain size: 15 μm).

Next, water was added to the resulting mixture liquid so that the solid content therein was adjusted to be 20%. Thus, a coating liquid was prepared.

The coating liquid was coated and dried on a base paper (40 g/m$^2$) in a dry weight of 4.0 g/m$^2$, with an air knife coater, to obtain a microcapsule sheet.

Comparative Example 2

The apparatus of FIG. 2 was used. The composition of the oily liquid used and that of the aqueous liquid used were same as those in Example 3. The temperature of the two liquids was 40° C. Emulsification in the emulsifier 8 was effected at 40° C. The resulting emulsion was filled in the encapsulating tank 9. When the encapsulating tank was filled with the emulsion, 0.4 part by weight, to 100 parts by weight of the emulsion, of tetraethylenepentamine, as a polyamine, and 40 parts by weight, to 100 parts by weight of the emulsion, of concentration adjusting water of 20° C. were added to the tank. Then, the content in the tank was heated up to 80° C. with a tank jacket and was kept at the temperature for 60 minutes to obtain a capsule liquid. The capsule liquid thus obtained is formed into a coating composition under the same condition as in Example 3, and the composition was coated and dried on a base paper to obtain a microcapsule sheet.

Each of the above-mentioned microcapsule sheet and a developer sheet were combined to form a pressure-sensitive recording sheet, which was evaluated by the tests mentioned below.

(1) Heat Resistance Test

Each microcapsule sheet was allowed to stand in an atmosphere of 120° C. for 4 hours and then lapped over a developer sheet under a load of 300 kg/cm$^2$ for coloration. A fresh sample not subjected to the above-mentioned heat treatment was also colored in the same manner as above. The density of each of the thus colored samples in the visible region was measured with Macbeth RD-918 Densitometer, and the ratio of the density of the heat-treated sample to that of the fresh sample was obtained.

(2) Solvent Resistance Test

Each microcapsule sheet was dipped in ethyl acetate for about one second and dried spontaneously. The dried sheet was lapped over a developer sheet under a load of 300 kg/cm$^2$ for coloration. A fresh sample not subjected to the above-mentioned solvent treatment was also colored in the same manner as above. The density of each of the thus colored samples in the visible region was measured with Macbeth RD-918 Densitometer, and the ratio of the density of the solvent-treated sample to that of the fresh sample was obtained. The test results are shown in Table 1 below.

TABLE 1

| | | Example 1 | Example 2 | Example 3 | Comparative Example 1 | Comparative Example 2 |
|---|---|---|---|---|---|---|
| 1) | Heat Resistance D(heat-treated)/D(fresh) × 100(%) | 95 | 92 | 94 | 40 | 32 |
| 2) | Solvent Resistance D(solvent-treated)/D(fresh) × 100(%) | 93 | 90 | 91 | 38 | 35 |

In accordance with the method of producing microcapsules of the present invention, mixture and emulsification and dispersion of the encapsulation system are effected at a high temperature from the initial stage, and the concentration of a colorant of a capsule core substance in the system may be high. The time necessary for elevating the reaction temperature may be short, and adhesion of precipitates to the wall of the tank for encapsulation is little so that the time for cleaning the tank may noticeably be reduced. In addition, the reaction container for encapsulation may be small-sized. The microcapsules to be obtained by the method of the present invention has excellent heat resistance and solvent resistance, as demonstrated in the examples. The producibility of such high-quality microcapsules of the present invention is high.

What is claimed is:

1. A method of continuous production of microcapsules comprising mixing a polyisocyanate with an oily liquid containing a capsule core substance, emulsifying and dispersing the mixture liquid in an aqueous liquid containing an emulsifier to form an emulsion and reaction the emulsion with a polyamine to form microcapsules each having a polyurethane-urea resin wall at the liquid-drop interface; the method further comprising continuously emulsifying the mixture liquid of said oily liquid and the aqueous liquid at a temperature higher than 50° C., then adding a polyamine and hot water both of a temperature higher than 50° C. to said emulsion and thereafter subjecting the emulsion to a wall forming treatment; wherein said adding of said polyamine and hot water is effected by continuously adding and mixing thereof to a pipe line containing said emulsified liquid and thereafter effecting the wall forming treatment;

and wherein the method additionally comprises overflowing the emulsion to which said polyamine and water have been continuously added by continuously feeding said emulsion from the bottom of an encapsulating device to the top thereof to continuously effect the wall forming treatment.

* * * * *